Dec. 15, 1936.     J. W. TATTER     2,064,574
BRAKE
Filed March 18, 1933
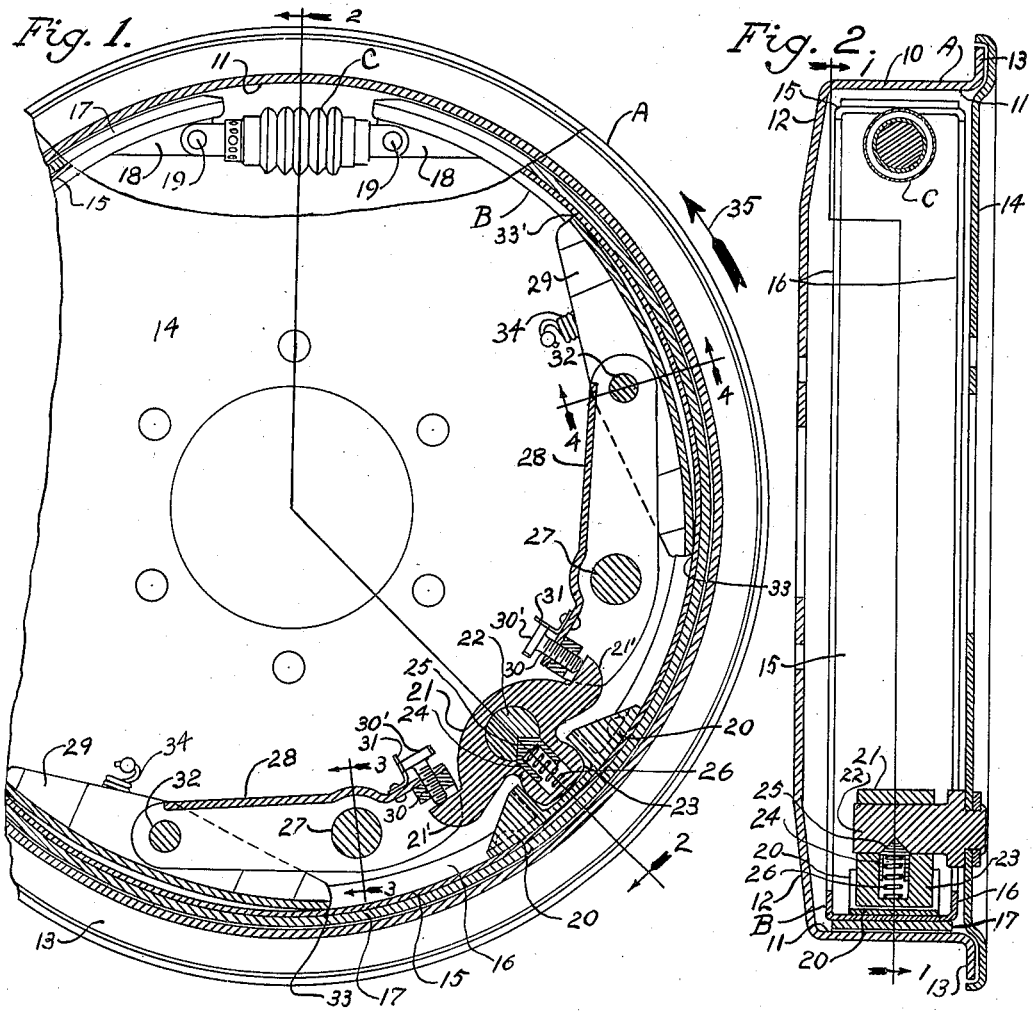
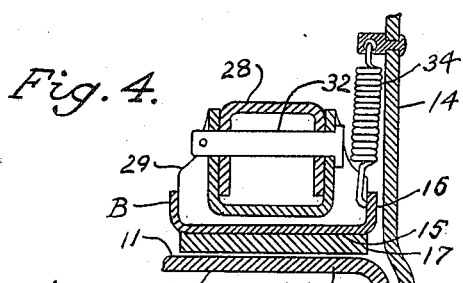
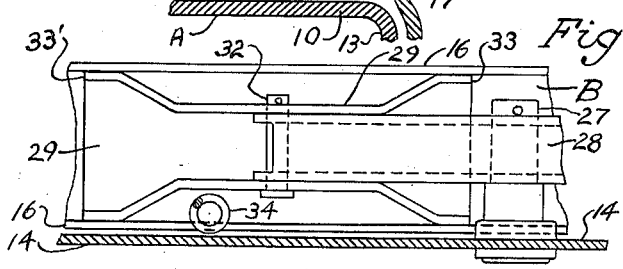
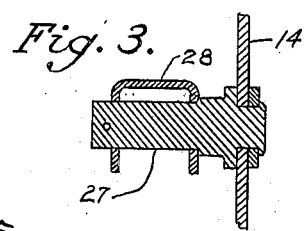
INVENTOR.
John W. Tatter.

Patented Dec. 15, 1936

2,064,574

UNITED STATES PATENT OFFICE 2,064,574

BRAKE

John W. Tatter, Detroit, Mich., assignor to Bendix Products Corporation, South Bend, Ind., a corporation of Indiana Application March 18, 1933, Serial No. 661,458

10 Claims. (Cl. 188—78)

My invention relates to brakes and more particularly to internal structure thereof for moving the brake shoe into engagement with the brake drum.

Much difficulty has been experienced with brakes in obtaining a uniform application of the braking pressure, especially with that type of brakes employing a single brake shoe that is moved into engagement with the drum by a single actuating unit such as employed with hydraulic, mechanical or air brakes. This has resulted in uneven wear of the brake lining, with the consequence that the life of the ordinary brake lining is comparatively brief, thereby necessitating frequent servicing of the brakes and replacing of worn out linings.

It is an object of my present invention to construct a brake structure in which is obtained a relatively more uniform equalization of the braking pressure.

Another object of my present invention is to construct a novel brake structure of the character described in which the brake adjustment can be readily obtained whereby to more readily center the shoe with respect to the brake drum for facilitating the uniform application of braking effort and to further provide for a smooth application of the brakes.

Still another object of my present invention is to minimize lost motion in brakes of the character described by providing a structure in which a minimum of back lash takes place between forward and reverse braking.

Further objects of my invention reside in the novel means for supporting the brake shoe and in the efficiently operated means by which the brake shoe is moved into engagement with the brake drum, and further in the improved means by which the preferred multiplication of movement can be obtained in applying the brakes.

For a more detailed understanding of my invention, reference may be had to the accompanying drawing, illustrating one embodiment of my invention, and in which:

Fig. 1 is an elevational view of a brake structure, partly in section, embodying the principles of my invention, and taken substantially on the line 1—1 of Fig. 2, Fig. 2 is a longitudinal sectional view thereof taken substantially on the line 2—2 of Fig. 1.

Fig. 3 is a detailed fragmentary sectional view of the anchor arm mounting taken substantially on the line 3—3 of Fig. 1, Fig. 4 is a fragmentary sectional view of the auxiliary shoes showing the connection of said auxiliary shoes with the anchor arm, and taken substantially on the line 4—4 of Fig. 1, and Fig. 5 is a fragmentary plan view showing the relation between the brake shoe and auxiliary shoe.

In the present embodiment of my invention, A designates a brake drum of standard construction, which comprises a cylindrical portion 10 having an inner cylindrical brake shoe engaging surface 11, an inwardly extending flange 12 at one end of the cylindrical portion for housing the brake shoe structure B and an outwardly flanged portion 13 at the other end of the cylindrical portion. The usual stationary back plate 14 may be secured in the usual manner for supporting the internal structure of the brake device.

The brake shoe structure B comprises a brake shoe 15 preferably constructed of sheet metal and eccentrically formed as shown in Fig. 1 with side flanges 16 having a less depth adjacent the ends of the shoe than at a midpoint. A brake lining 17 is riveted or otherwise secured to the outer face of the brake shoe whereby to provide a friction surface for engagement with the inner cylindrical surface 11 of the brake drum A. A hydraulic activating device C is preferably located as shown in Fig. 1 adjacent to and secured to the free ends of the brake shoe, said device being adapted to expand the shoe into engagement with the brake drum. The said actuating device is preferably hinged to brackets 18 secured or otherwise fixed to the free ends of the brake shoe 15 as at 19.

At a suitable point intermediate the ends of the brake shoe, are preferably secured thereto the spaced brackets or abutments 20, arranged to extend substantially radially inwardly of the shoe. A rocker arm structure 21 is supported on the pin or stud 22 and preferably carries a ball portion 23 adapted for engagement between the brackets or abutments 20 (see Figs. 1 and 2). A spring pressed plunger 24 is carried within the rocker arm and yieldingly urged into a recess or notch 25 in the stud 22 by a spring 26 in order to lock the rocker arm to said stud against relatively angular and axial movement.

Said back plate 14 further carries a stud or pin 27 that pivotally supports the arms 28, these arms being preferably termed shoe anchor arms and preferably constructed of channel shaped stampings, the side walls of said channel shaped arms provided with holes through which the pins 27 engage. I preferably provide two such arms (see Fig. 1) which are substantially identical in construction and operation, and therefore a description of the construction and operation of one of such arms will be sufficient for a complete understanding of my invention.

One end of each arm is constructed for engagement with the rocker arm 21, while the other end of each arm carries an auxiliary shoe or pressure member 29 which is adapted to engage the brake shoe 15. That end of the arm adjacent the rocker arm 21 adjustably carries the screw threaded stud or bolt 30, that directly engages the extension 21' of the rocker arm 21, a spring or other yielding device 31 carried by said arm being adapted to yieldingly engage the notched or serrated head 30" of the adjustable stud or bolt 30 to hold the same in adjustment. The auxiliary shoe carried by the other end of the arm by means of the pin 32 is preferably constructed to extend to both sides of the pin 32 and is adapted to engage the brake shoes at spaced points 33 and 33' at or near the extreme ends of the auxiliary shoe. Obviously the length of the auxiliary shoe may be varied as desired and the point of attachment of said shoe with the anchor arm need not be substantially midway as shown, depending largely on the size of brake and the particular places at which it is determined to apply the pressure.

A spring or other suitable tension device 34 is employed to yieldingly urge the brake shoe away from the brake drum and this spring 34 also acts to maintain said brake shoe in engagement with the auxiliary shoe 29. Preferably said auxiliary shoe 29 is constructed with end portions that are of substantially the same width as the spacing between the side flanges of the brake shoe (see Fig. 5) in order to accurately center the shoe with respect to the cylindrical portion 10 of the brake drum and to otherwise definitely locate the brake shoe.

The operation of my brake may be best understood by assuming a definite direction of rotation of the brake drum and, therefore, the drum may be assumed as rotating on the direction of the arrow 35. On engagement of the brake shoe with the drum, the brake shoe tends to creep along with the drum or rotate therewith and thus the brackets or abutments 20 are also moved along with the brake shoe and drum with respect to the stationary back plate 14. The rocker arm 21 thus tends to rock the arm 21' to the right exerting a pressure inwardly of the brake structure against the bolt 30 carried by the arm 28 with a consequential production of pressure by the auxiliary shoe 29 radially outwardly of the brake structure against the brake shoe to supplement the pressure of the brake shoe against the drum as produced by the hydraulic actuating device C.

While the arm 28 and associated shoe 29 to the right as seen in Fig. 1 is applying pressure to the brake shoe, the other arm and associated auxiliary shoe is inoperative due to the fact that the left arm 21' of the rocker arm 21 is urged away from engagement with the bolt 30 carried by said other anchor arm. The rotation of the brake drum in a reverse direction to the arrow 35 will obviously reverse the operation of the mechanism as explained above.

It is well known that with a brake structure of the character illustrated in the accompanying drawing that the friction between the shoe and drum produces a greater pressure between said drum and approximately one half of the shoe than between the drum and the other half of the shoe. My device is therefore constructed in such a way as to increase the pressure against the drum of that portion of the brake shoe that ordinarily is engaged therewith with lesser pressure in order to uniformly equalize the application of pressure around the shoe, whereby to provide for substantially uniform wear of the brake lining.

It will be obvious that an adjustment of the normal clearance between the brake drum and shoe may be had by adjusting the bolts 30, and these bolts or adjusting screws 30 are preferably located so as to be readily accessible.

Although I have shown but one embodiment of my invention in the accompanying drawing and have described a particular application thereof, it will be apparent to those skilled in the art to which my invention pertains, that various modifications and changes may be made therein without departing from the spirit of my invention or from the scope of the appended claims:

I claim:

1. In a brake, a brake drum, a back plate, a brake shoe, means for actuating the brake shoe whereby to effect a braking engagement between the shoe and drum, said shoe including a portion having a tendency to disengage itself from the drum, and means operatively carried by said back plate and including a movably supported actuator and a pressure member operatively connected with the actuator, said pressure member being movably supported by said back plate intermediate the actuator support and the brake shoe actuating means, said actuator operated in response to a slight rotational movement of the shoe resulting from the engagement of the shoe with the drum, whereby to move said pressure member and apply pressure about the middle of the shoe portion tending to disengage from the drum for providing substantially uniform engagement of the whole shoe with said brake drum.

2. In a brake, a brake drum, a back plate, a brake shoe, means for actuating the brake shoe whereby to effect a braking engagement between the shoe and drum, said shoe including a portion having a tendency to disengage itself from the drum, and means including an actuator movably supported by said back plate and a pressure member operatively connected with the actuator, said pressure member being movably supported by said back plate intermediate the actuator support and the brake shoe actuating means, said actuator operated in response to a slight rotational movement of the shoe resulting from the engagement of the shoe with the drum, whereby to move said pressure member and apply pressure on the shoe portion tending to disengage from the drum for providing substantially uniform engagement of the whole shoe with said brake drum, and adjusting devices intermediate said actuator and pressure member.

3. In a brake, a brake drum, a brake shoe, means for actuating the brake shoe whereby to effect a braking engagement between the shoe and drum, said shoe including a portion having a tendency to disengage itself from the drum, and means including a movably supported actuator and a pressure member operatively connected with the actuator, said actuator operated in response to a slight rotational movement of the shoe resulting from the engagement of the shoe with the drum, whereby to move said pressure member and apply pressure on the shoe portion tending to disengage from the drum for providing substantially uniform engagement of the whole shoe with said brake drum, and means for adjusting the position of said pressure member relative to the shoe whereby to adjust the clearance between said shoe and drum when the brake is inoperative.

4. In a brake, a brake drum, a brake shoe, means for actuating the brake shoe whereby to effect a braking engagement between the shoe and drum, said shoe including a portion having a tendency to disengage itself from the drum, and means including a movably supported actuator and a pressure member operatively connected with the actuator, said actuator operated in response to a slight rotational movement of the shoe resulting from the engagement of the shoe with the drum, whereby to move said pressure member and apply pressure on the shoe portion tending to disengage from the drum for providing substantially uniform engagement of the whole shoe with said brake drum, said pressure member having spaced points of contact with said brake shoe.

5. In a brake, a brake drum, a brake shoe, means for actuating the brake shoe whereby to effect a braking engagement between the shoe and drum, said shoe including a portion having a tendency to disengage itself from the drum, and means including a movably supported actuator and a pressure member operatively connected with the actuator, said actuator operated in response to a slight rotational movement of the shoe resulting from the engagement of the shoe with the drum, whereby to move said pressure member and apply pressure on the shoe portion tending to disengage from the drum for providing substantially uniform engagement of the whole shoe with said brake drum, said operative connections between said actuator and pressure member including a motion multiplying device.

6. In a brake, a brake drum, a brake shoe, means for actuating the brake shoe whereby to effect a braking engagement between the shoe and drum, said shoe including a portion having a tendency to disengage itself from the drum, and means including a movably supported actuator and a pressure member operatively connected with the actuator, said actuator operated in response to a slight rotational movement of the shoe resulting from the engagement of the shoe with the drum, whereby to move said pressure member and apply pressure on the shoe portion tending to disengage from the drum for providing substantially uniform engagement of the whole shoe with said brake drum, and a back plate for supporting said brake shoe and said means, said operative connections between said actuator and pressure member including a motion multiplying lever pivotally supported by said back plate.

7. In a brake, a brake drum, a back plate, a brake shoe, means for actuating the brake shoe whereby to effect a braking engagement between the shoe and drum, said shoe including a portion having a tendency to disengage itself from the drum, and means including an actuator movably supported by said back plate and a pressure member operatively connected with the actuator, said pressure member being movably supported by said back plate intermediate the actuator support and the brake shoe actuating means, said actuator operated in response to a slight rotational movement of the shoe resulting from the engagement of the shoe with the drum, whereby to move said pressure member and apply pressure on the shoe portion tending to disengage from the drum for providing substantially uniform engagement of the whole shoe with said brake drum, said brake shoe being supported by said second means and centered with respect to said brake drum.

8. A brake pressure equalizing device for a brake structure having a brake drum and a back plate, a brake shoe, and means for moving the shoe whereby to effect braking engagement of the shoe with said drum, said device including a pair of pressure members each engaging a portion of the shoe tending to disengage itself from the drum during the braking operation, and means operatively carried by said back plate for actuating one or the other of said pressure members to apply a supplemental pressure solely to that shoe portion engaged thereby whereby to provide substantially uniform braking pressure between the shoe and drum substantially around the shoe.

9. A brake pressure equalizing device for a brake structure having a brake drum, a brake shoe, and means for moving the shoe whereby to effect braking engagement of the shoe with said drum, said device including a pressure member engaging a portion of the shoe tending to disengage itself from the drum during the braking operation, and means for actuating said pressure member to apply a supplemental pressure to that shoe portion engaged thereby whereby to provide substantially uniform braking pressure between the shoe and drum substantially around the shoe, and adjusting devices whereby to selectively adjust the actuation of said pressure member.

10. In a brake, a brake drum, a brake shoe, a back plate means for actuating the brake shoe whereby to effect a braking engagement between the shoe and drum, said shoe having a portion tending to disengage itself from the drum when actuated to effect a braking engagement with said drum, a brake pressure equalizing means for the brake structure including an actuator pivotally supported by said back plate and actuated in response to relative rotational movement of said brake shoe and back plate, and a pair of pressure members supported by said back plate on opposite sides of said actuator support and each operatively connected with said actuator, the actuation of said actuator actuating one or the other of said pressure members to apply a supplemental pressure solely to that shoe portion having a tendency to disengage itself from the drum.

JOHN W. TATTER.